__United States Patent__ [19]

Kimball

[11] Patent Number: 4,719,121

[45] Date of Patent: Jan. 12, 1988

[54] METHOD OF MAKING A MAGNETIC RECORDING MEDIUM AND COMPOSITION

[75] Inventor: David J. Kimball, Remus, Mich.

[73] Assignee: Dow Corning Corporation, Midland, Mich.

[21] Appl. No.: 874,751

[22] Filed: Jun. 16, 1986

[51] Int. Cl.$^4$ .............................................. H01F 10/02
[52] U.S. Cl. .................................. 427/48; 252/62.54; 252/62.55; 252/62.56; 427/128; 427/130; 427/132; 428/694; 428/900; 528/25; 556/404
[58] Field of Search ................................ 427/127–132, 427/48; 428/694, 900; 252/62.54, 56, 55; 528/25; 556/404

[56] References Cited

U.S. PATENT DOCUMENTS

| | | | |
|---|---|---|---|
| 4,076,890 | 2/1978 | Yamada et al. | 428/337 |
| 4,271,234 | 6/1981 | Schonafinger et al. | 428/405 |
| 4,419,257 | 12/1983 | Frew et al. | 252/62.54 |
| 4,438,156 | 3/1984 | Homola et al. | 252/62.54 |
| 4,501,795 | 2/1985 | Takeuchi et al. | 428/329 |

*Primary Examiner*—Bernard D. Pianalto
*Attorney, Agent, or Firm*—Alexander Weitz

[57] ABSTRACT

An improved dispersant composition for magnetic media, comprising the reaction product of a phosphate ester and a silicon compound, is described. The silicon compound may be selected from diphenysilanediol or a trialkoxysilane having alkyl, alkenyl, haloalkyl, acryloxypropyl, methacryloxypropyl, or phenyl functionality. A magnetic coating composition and a process for producing a magnetic recording medium having improved magnetic properties, which employ the above dispersant composition, are also disclosed.

22 Claims, No Drawings

METHOD OF MAKING A MAGNETIC RECORDING MEDIUM AND COMPOSITION

This invention relates to a magnetic recording medium. More particularly, this invention relates to a dispersant for magnetic pigment particles in a magnetic coating composition which is used to produce a medium showing excellent magnetic properties.

BACKGROUND OF THE INVENTION

Magnetic media conventionally comprise a magnetic coating on a non-magnetic substrate (support). The magnetic coating, which is generally applied as a suspension in an organic solvent and is subsequently dried, is basically made up of fine magnetic pigment particles, such as iron oxide, dispersed in a polymeric resin binder, but may also contain lubricants and other additives. For many applications, such as video tape, computer tape, audio tape, floppy disks and rigid disks, the magnetic properties of the magnetic coating must be optimized in order to take advantage of the increased sophistication and capabilities of modern recording and computer hardware. Thus, for example, squareness ratio (SR) should be as high as possible, coercivity (Hc) should be high and switching field distribution (SFD) should be kept low. These properties are readily calculated from a magnetization curve (B-H curve) as illustrated, for example, in U.S. Pat. No. 4,438,156. Squareness ratio is equal to the quotient of retained magnetic flux divided by maximum magnetic flux and high values indicate greater retention of information stored in the magnetic media. Coercivity is a measure of the difficulty of erasing a recorded signal and high values result in improved "protection" of stored information. Switching field distribution is a measure of the variation in particle coercivity in a magnetic medium. A small SFD gives a well-defined recording zone and increased output at short wavelengths. Of these variables, the squareness ratio is most important; it represents the effectiveness of the dispersion of magnetic particles, and high values result in increased long wavelength output of the magnetic medium.

Superior magnetic properties can, however, only be attained when the magnetic pigment is well dispersed in the medium, such that the individual magnetic particles do not interfere with each other. Unfortunately, the magnetic pigments, which are of microscopic dimensions, are difficult to disperse and often tend to agglomerate in the magnetic coating compositions. This difficulty has been resolved in the art to some degree by including a dispersant in the magnetic coating composition.

Early formulations employed small quantities of the natural product lecithin, or a phosphate ester, as dispersant. Use of a phosphate ester dispersant to achieve good dispersion, improved durability and reduced discontinuities is claimed in U.S. Pat. No. 4,419,257 to Frew et al. Therein, the phosphate ester is combined with a solvent system, which includes a dibasic ester, and has specific Hansen three-dimensional solubility parameter values. Such dispersants do improve the dispersion quality in a magnetic coating composition, but they can not chemically bind to the pigment particles, and so are free to migrate within the magnetic coating composition, even when the latter is dried onto a substrate to form the magnetic medium. This free dispersant tends to plasticize (i.e., soften) the polymeric binder as well as migrate to the surface of a finished magnetic medium where it can, for example, mix with lubricant and thereby adversely affect frictional properties. Once at the surface of a magnetic medium, the dispersant can potentially oxidize, pick up debris or deposit on recording heads. These undesirable effects often become more pronounced as the amount of dispersant which is added to the magnetic coating composition is increased. Such an increase of dispersant level is generally necessary when high surface area or metal pigments are employed. Furthermore, the plasticization of the binder and ability of the dispersant to migrate away from the magnetic particles, even when the magnetic coating composition has dried, may permit some particle re-agglomeration which, in turn, leads to inferior magnetic properties with time. Because of such disadvantages, it is desirable to reduce the amount of phosphate ester dispersant in magnetic coating compositions.

Organosilanes having hydrolyzable groups have been employed in the art to improve dispersion. These materials are believed to form physiochemical bonds with reactive groups on the surface of the magnetic pigment. Moreover, silane coupling agents, which also contain functionality capable of reacting with the binder resin of a magnetic coating composition, may be employed. Thus, for example, Schonafinger et al., in U.S. Pat. No. 4,271,234, disclose the treatment of iron oxide pigment with various silanes including alkyltrimethoxysilane, vinyltrimethoxysilane, gamma-glycidyloxypropyltrimethoxysilane, gamma-aminopropyltriethoxysilane and methacryloxyethyltrimethoxysilane. When this treated iron oxide is formulated into a magnetic coating, improved dispersion of the pigment, as well as increased durability of the magnetic coating, is reported.

Chlorosilane and alkoxysilane coupling agents are taught by Yamada et al., in U.S. Pat. No. 4,076,890, to modify a magnetic coating mixture. In this case, a large number of silanes is disclosed, and incorporation of the silane into the composition may be by way of treating the magnetic pigment or by direct addition to said composition. The resulting magnetic media are claimed to be abrasion resistant and improved with respect to adhesion between magnetizable layer and support substrate, thereby exhibiting reduced powder dusting from tape edges.

The reaction product of a phosphoric ester with an polyisocyanate compound having at least two isocyanate groups, or an isocyanate compound having a hydrolyzable alkoxysilane, is disclosed by Takeuchi et al., in U.S. Pat. No. 4,501,795. When this reaction product is employed as a dispersant in a magnetic coating composition, good dispersibility of the magnetic powder and excellent durability of the magnetic layer (coating) are said to result.

SUMMARY OF THE INVENTION

It has now been found that reaction products of a phosphate ester and certain alkoxysilanes are good dispersants for magnetic pigments. Unlike the phosphate esters, these compositions can form chemical attachments with reactive groups on the magnetic particles. Moreover, they impart improved magnetic properties when compared with either the silanes alone or with the reaction products of phosphate ester and isocyanate-functional alkoxysilanes.

This invention thus relates to a composition comprising: the reaction product of (a) from about 40 to about 80 parts by weight of a phosphate ester represented by the formula

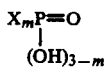

wherein X is independently selected from the group consisting of RO—, RO(R'O)$_n$— and

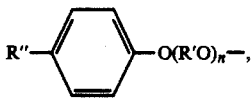

in which R represents an alkyl radical having from 1 to 25 carbon atoms, R' is an alkylene group having 2 to 4 carbon atoms, R" is an alkyl radical having 5 to 15 carbon atoms, n is an integer between 1 and 100 and the average value of m is between 1 and 2; and (b) from about 20 to about 60 parts by weight of a silicon compound selected from the group consisting of diphenylsilane diol and a silane represented by the formula $$ZSi(OR''')_3$$

wherein R''' is an alkyl group having from 1 to 3 carbon atoms and Z is selected from the group consisting of an alkyl group having 1 to 6 carbon atoms, a haloalkyl group having 2 to 6 carbon atoms, an alkenyl group having 2 to 6 carbon atoms, acryloxypropyl, methacryloxypropyl and phenyl.

This invention further relates to a magnetic coating composition comprising: magnetic pigment particles; a binder for said particles; and a dispersant for said particles, wherein said dispersant is the above described composition.

This invention also relates to a process for producing a magnetic recording medium comprising:
(i) mixing magnetic pigment particles, a binder for said particles, a dispersant and an inert organic solvent capable of dissolving said binder, to obtain a uniform dispersion thereof;
(ii) coating said dispersion onto a non-magnetic substrate;
(iii) orienting said magnetic pigment particles in a magnetic field; and
(iv) removing said solvent from said dispersion, said dispersant being the above described composition.

DETAILED DESCRIPTION OF THE INVENTION

The dispersant of the present invention is the reaction product of a phosphate ester and a silicon compound. This dispersant may be advantageously combined with magnetic pigment particles, a binder for said particles and an inert solvent for said binder, to produce a wet magnetic coating composition. The wet magnetic coating composition may, in turn, be coated onto a non-magnetic substrate and dried to form a magnetic recording medium.

The dispersant of this invention imparts good dispersion of the magnetic pigment particles in the magnetic coating composition, as evidenced by measurements of squareness ratio (SR), coercivity (Hc) and switching field distribution (SFD) on the resultant magnetic medium. This dispersant can, furthermore, bond to reactive groups on the surface of the magnetic pigment, and thus stabilize the dispersion of said pigment, thereby reducing re-agglomeration. Moreover, good magnetic properties result at a lower total phosphate ester content. This desired result is surprising since the silicon compounds, when employed alone as dispersants, lead to significantly inferior magnetic properties.

The phosphate ester of the present invention is represented by the formula

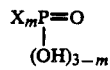 (I)

wherein X may be independently selected from the group consisting of RO—, RO(R'O)$_n$— and

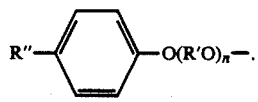

In the above formula, R represents an alkyl radical having from 1 to 25 carbon atoms, such as methyl, ethyl, propyl, n-hexyl, 2-ethylhexyl, n-octyl or stearyl. R' is an alkylene group having 2 to 4 carbon atoms, such as ethylene or tetramethylene. R" is an alkyl radical having 5 to 15 carbon atoms, such as pentyl, hexyl, octyl, nonyl or dodecyl. Herein, n is an integer which may range from 1 to 100, inclusive. Blends of phosphate esters may be used for the purposes of this invention such that m, in the above formula, may have an average value between 1 and 2.

Examples of phosphate esters which may be employed in the instant invention include monododecyl phosphate, didodecyl phosphate, monododecylpolyoxyethylene phosphate, monooctadecylpolyoxyethylene phosphate, dioctylpolyoxyethylene phosphate.

In preferred embodiments of the invention, the phosphate ester is a blend of mono and di-esters wherein X is either RO(CH$_2$CH$_2$O)$_n$— or i.e.,

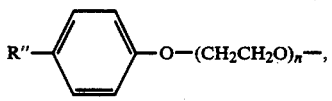

alkyl groups R and R" each has from 8 to 12 carbon atoms, n is 5 to 40 and m is about 1.5. These compounds are particularly preferred when the acid number of the phosphate ester blend, determined at the first inflection point of pH=5-5.5, is between about 60 and 120.

The phosphate esters of this invention are well known in the art and many of them are commercially available. They may be prepared by the reaction of phosphoric acid with the corresponding organic alcohol.

The silicon compound to be reacted with the above mentioned phosphate ester to form the dispersant of this invention is at least one compound selected from the group consisting of diphenylsilanediol and a silane represented by the formula $$ZSi(OR''')_3 \qquad (II).$$

In formula (II), R''' is a lower alkyl group having 1-3 carbon atoms, such as methyl, ethyl or propyl, methyl being preferred. Z may be an alkyl group having 1 to 6 carbon atoms, such as methyl, ethyl, propyl, butyl or hexyl, n-propyl being preferred. Alternatively, Z may be a haloalkyl group having 2 to 6 carbon atoms, such as chloropropyl, fluoropropyl or chlorobutyl, gamma-chloropropyl being preferred. Z may also be an alkenyl group having 2 to 6 carbon atoms, such as vinyl or allyl, vinyl being preferred. Z may still further be selected from acryloxypropyl or methacryloxypropyl, the latter being preferred. Finally, Z may be a phenyl group.

Examples of silanes which may be used in this invention include Y-chloropropyltrimethoxysilane, phenyltrimethoxysilane, vinyltrimethoxysilane, n-propyltrimethoxysilane, ethyltriethoxysilane, 3-methacryloxypropyltrimethoxysilane, phenyltriethoxysilane, methyltrimethoxysilane, allyltrimethoxysilane, isobutyltrimethoxysilane, n-hexyltrimethoxysilane, 3-acryloxypropyltrimethoxysilane and mixtures thereof.

The silicon compounds of this invention are well known to those skilled in the art and many of them are products of commerce.

The dispersant of the present invention is prepared by reacting about 40 to about 80 parts by weight of the phosphate ester with about 20 to 60 parts by weight of the silicon compound, a weight ratio of about 50:50 of the reactants being preferred. This reaction can be effected by simply mixing the reactants, preferably at an elevated temperature of approximately 60° to 150° C. The heating is continued until the acid number of this mixture drops to the point where it no longer changes with time. At a temperature of 60° C., for example, the time required for the reaction is generally between about 16 and about 48 hours. A preferred procedure involves heating the components at about 100° C. to trap volatile by-products. When volatiles formation is essentially complete, the mixture is heated to approximately 150° C. for an additional hour and then stripped under reduced pressure to remove remaining volatile by-products and unreacted silicon compound. The resultant dispersant is filtered to complete the process.

The amount of dispersant needed to aid in the dispersion of magnetic pigment, described infra, depends on the specific surface area of the latter, and may readily be ascertained by those skilled in the art after a few simple experiments. In general, the minimum amount of the dispersant compatible with desired magnetic properties of the magnetic medium is employed. Thus, for example, when cobalt-modified iron oxide pigment having an area of about 22 square meters per gram is used, about 2 to 5 parts per hundred parts of said pigment, on a weight basis, (pph) of dispersant is required, preferably about 4 pph. On the other hand, a similar pigment, having an area of about 42 square meters per gram, requires about 5 to 10 pph of the dispersant, preferably about 8 pph.

The magnetic pigment particles of this invention are well known in the art. These are finely divided ferromagnetic materials which may be oxides, such as iron oxide or chromium dioxide, or may be metal alloys which comprise, in majority, a ferromagnetic metal such as iron, cobalt, nickel or alloys thereof. A preferred pigment is cobalt-modified iron oxide which has a length to breadth ratio of from about 2:1 to about 20:1, preferably about 6:1, and an average length of about 0.2 to 3 micrometers.

The binder employed in the present invention may be any suitable resin capable of binding the magnetic pigment particles to each other as well as to the non-magnetic substrate. These materials are also well known in the art, examples being polyurethane, poly(vinyl chloride), polyester, poly(vinylidene chloride), epoxy resin, poly(acrylonitrile), polyacrylic esters, polymethacrylic esters, polyamide, poly(vinyl acetal), poly(vinyl butyral), poly(vinyl pyridine), polycarbonate, polysulfone, phenol formaldehyde resin and melamine formaldehyde resin. A preferred binder is polyurethane. Typically, the binder content of the magnetic coating composition is between about 2 and 30 parts on a weight basis per 100 parts of the magnetic pigment in the composition.

In addition to the magnetic pigment particles, dispersant and binder, the magnetic coating compositions of this invention can contain various adjuvants known in the art to improve the final characteristics of the magnetic medium. Suitable adjuvants include lubricants, corrosion inhibitors, antistatic agents and polishing agents. Typically, the magnetic coating composition may contain from about 2 to about 10 parts by weight of such adjuvants, based on 100 parts (pph) of the magnetic pigment particles.

Suitable substrates for use in the present invention include polymers, such as polyethylene terephthalate, polyethylene, polypropylene, cellulose triacetate, polycarbonate and polyimides. Alternatively, the substrate may be a non-magnetic metal, such as aluminum, copper, tin, zinc, magnesium or alloys thereof. The form of the substrate is not critical, films, tapes, sheets, discs and drums being within the scope of this invention.

The present invention also relates to a process for producing a magnetic recording medium using the above described components.

First, a wet magnetic coating composition (dispersion) is prepared by simultaneously, or sequentially, introducing the magnetic pigment particles, dispersant, binder, an inert organic solvent and, optionally, adjuvants to a mixer such as a ball mill, two-roll mill, continuous media mill, sand mill, colloid mill or homogenizer and thoroughly mixing the ingredients till a good dispersion is attained. The inert organic solvent selected should be a good solvent for the binder. Examples of suitable solvents include cyclohexanone, methyl ethyl ketone, tetrahydrofuran, methyl isobutyl ketone and butyl acetate. In practice, the binder is preferably added in the form of a solution in one or more of these solvents. It is also preferred to pre-blend the magnetic coating composition, including solvent, using gentle agitation, such as rolling in a jar at room temperature for a period ranging from about 2 hours to about 48 hours, before mixing as described above.

Alternatively, the magnetic pigment may first be treated with the dispersant by mixing these two components along with the inert solvent and then mixing this combination with the binder and other ingredients, as above. In this case, the solvent may optionally be removed to form a treated magnetic pigment before said mixing operation.

Magnetic recording medium is prepared by applying the solvent-containing (wet) magnetic coating composition, described above, to a substrate, orienting the magnetic pigment particles in a magnetic field, and drying the coating (i.e., evaporating the inert solvent). Application of the coating to the substrate may be accomplished by any of the usual methods known in the art, such as blade coating, reverse roll coating, or gravure coating. The removal of solvents, or drying, may be carried out at a temperature of about 15° to 40° C., preferably at about 22° C. Dry coating thickness obtained can be varied according to the particular application, but generally is kept between 0.1 and 0.6 mil.

EXAMPLES

The following examples are presented to further illustrate the invention, but are not to be construed as limiting the invention, which is delineated in the appended claims. All parts and percentages in the examples are on a weight basis unless indicated to the contrary.

EXAMPLES 1-15

Gafac ® RE-610 (GAF Corp., Wayne, N.J.) surfactant is described as a blend of phosphate mono- and di-esters of the ethylene oxide-adduct type, having the general formulas

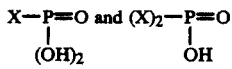

wherein X is

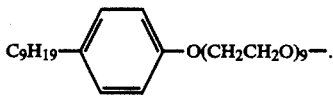

This surfactant is further described as a slightly hazy, viscous liquid, having a maximum moisture content of 0.5%, a specific gravity of 1.10 to 1.12, an acid number of 62-72 and a pH<2.5 (10% solution at 25° C.).

Ten grams of Gafac ® RE-610 was mixed with an equal weight of each of the silicon compounds listed in Table 1 in a glass one-ounce vial. The vial was capped and heated in a water bath at 60° C. till the acid number of the mixture did not change with time. Generally, anywhere from 16 to 48 hours was found to be effective and the acid number changed less than about 5% between subsequent measurements. The resultant reaction product was cooled and used to formulate magnetic media as follows.

Each of the reaction products of Examples 1 to 15 was used as the dispersant in a magnetic coating formulation consisting of:

20.0 g Pferrico ® 2566 iron oxide 0.8 g dispersant (i.e., 4 parts per hundred parts iron oxide; 4 pph)

8.3 g Estane ® 5701 binder solution (12% in cyclohexanone)

30.0 g cyclohexanone solvent.

Pferrico ® 2566 (Pfizer Pigments, Inc., New York, N.Y.) is described as a cobalt-modified iron oxide particle having a cobalt content of 3.0%. It is further defined as having average dimensions of 0.07 micron (width) by 0.40 micron (length), an acicularity ratio of 6.1 and a surface area of 22.5 m²/g. Estane ® 5701 F-1 (B. F. Goodrich Company, Cleveland, Ohio) is described as a polyester-based polyurethane resin.

Each magnetic coating composition was milled in a 5.5 oz stainless steel container filled with approximately 350 grams of steel balls having a diameter of about ⅛ in. The milling was accomplished by vibrating the container and its contents on a standard paint shaker for 15 minutes at room temperature.

After the above milling procedure, each composition was coated onto 1.42 mil thick video-grade poly(ethylene teraphthalate) film using a draw-down coating bar having a 1 mil gap at a coating speed of approximately one foot per second. Simultaneous to the coating procedure, the still wet magnetic coating was subjected to orientation by a 2,000 Oersted one-way magnet in a direction parallel to the draw axis. The coated film was allowed to dry at room temperature for at least one hour, whereupon two 20 inch-long by ⅜ inch-wide tape sections were cut longitudinally (i.e., along the draw direction) from said film. The tape sections were folded in half (lengthwise) and inserted into a 10 mm diameter glass sample tube for magnetic property evaluation as follows.

An LDJ B/H meter, model number 7500A (LDJ, Troy, Mich.), was used to determine the squareness ratio (SR), coercivity (Hc), and switching field distribution (SFD) at 22° C. using a frequency of 60 Hz and a longitudinally applied field of 3,000 Oe. At least 5 readings were taken for each sample and averaged to obtain the results reported in Table 1.

The compositions of this invention exhibited magnetic properties which were better than those based on reaction products of comparative silicon compounds, including the isocayanate compound, Example 10. These compositions were also essentially as effective as dispersants which can not bind to the magnetic pigment particles (i.e., lecithin and Gafac ® RE-610).

TABLE 1
MAGNETIC PROPERTIES OF MEDIA EMPLOYING REACTION PRODUCT OF SILICON COMPOUNDS AND GAFAC ® RE-610 AS DISPERSANT

|  | Silicon Compound | SR | Hc (Oersteds) | SFD |
|---|---|---|---|---|
| Example No. (Present Invention) | | | | |
| 1 | gamma-chloropropyltrimethoxysilane | 0.81 | 754 | 0.49 |
| 2 | phenyltrimethoxysilane | 0.81 | 755 | 0.50 |
| 3 | n-propyltrimethoxysilane | 0.80 | 751 | 0.50 |
| 4 | vinyltrimethoxysilane | 0.81 | 755 | 0.50 |
| 5 | diphenylsilanediol | 0.80 | 740 | 0.50 |
| 6 | gamma-methacryloxypropyltrimethoxysilane | 0.80 | 759 | 0.50 |
| (Comparative) Example No. | | | | |
| 7 | N—2-aminoethyl-3-aminopropyltrimethoxysilane | 0.77 | 746 | 0.54 |
| 8 | 3-aminopropyltriethoxysilane | 0.78 | 744 | 0.53 |
| 9 | (structure: benzothiazole-S-(CH₂)₂Si(OMe)₃) | 0.67 | 717 | 0.69 |

TABLE 1-continued
MAGNETIC PROPERTIES OF MEDIA EMPLOYING REACTION PRODUCT OF SILICON COMPOUNDS AND GAFAC ® RE-610 AS DISPERSANT

| | Silicon Compound | SR | Hc (Oersteds) | SFD |
|---|---|---|---|---|
| 10 | OCN(CH$_2$)$_3$Si(OEt)$_3$ | 0.76 | 732 | 0.56 |
| 11 | CH$_2$—CH$_2$—(CH$_2$)$_3$SiMe(OSiMe$_3$)$_2$ (epoxide) | 0.73 | 736 | 0.63 |
| 12 | CH$_2$—CH$_2$—O(CH$_2$)$_3$Si(Me)$_2$OSi(Me)$_3$ (epoxide) | 0.66 | 708 | 0.72 |
| 13 | octadecyltrimethoxysilane | 0.78 | 739 | 0.54 |
| 14 | None (Gafac ® RE-610 alone) | 0.82 | 769 | 0.52 |
| 15 | None (Lecithin alone) | 0.82 | 760 | 0.51 |

Me = methyl;
Et = ethyl

EXAMPLE 16

The silane of Example 1 (i.e., gamma-chloropropyltrimethoxysilane) was reacted with Gafac ® RE-610 in various proportions according to the following procedure. A 500 ml, 3-neck flask equipped with a stirrer, thermometer, water trap and condenser was charged with 100 grams of one of the mixtures shown in the first two columns of Table 2. The contents were heated to 100° C., while stirring, and held at this temperature for 16 hours. During this time, volatile by-products, mainly methanol, were removed from the flask. An additional heating at 150° C. for approximately 2 hours followed to complete the reaction and remove the rest of the by-products. A portion of each sample was formulated into a magnetic coating and a tape specimen produced according to the methods described above. The respective magnetic properties were determined, results of which are reported in Table 2 under the heading "Unstripped." The remaining reaction product in the flask was then stripped of unreacted chloropropyltrimethoxysilane at 150° C. and a reduced pressure of 7-8 mm mercury until no more volatiles were being transferred to the trap. This step generally took about 2 hours or less. Each of these reaction products was likewise used to produce a magnetic tape which was subsequently evaluated. The results, in this case, are reported in Table 2 under the heading "Stripped." It is apparent from Table 2 that, when only gamma-chloropropyltrimethoxysilane was employed as dispersant, the magnetic properties were significantly inferior.

The 50:50 gamma-chloropropyltrimethoxysilane: Gafac ® RE-610 composition of Table 2 was scaled up by a similar procedure, wherein 3700 grams of each component was reacted, and the silane had a slightly greater chlorine content than before. The resultant magnetic tape, which employed this dispersant, had the following excellent magnetic properties: SR=0.84; Hc=751; SFD=0.50.

TABLE 2
MAGNETIC PROPERTIES OF MEDIA EMPLOYING CHLOROPROPYLTRIMETHOXYSILANE/GAFAC ® RE-610 REACTION PRODUCT AS DISPERSANT

| gamma-Chloropropyltri-methoxysilane (Parts) | Gafac ® RE-610 (Parts) | Unstripped | | | Stripped | | |
|---|---|---|---|---|---|---|---|
| | | SR | Hc | SFD | SR | Hc | SFD |
| 0 | 100 | 0.81 | 749 | 0.49 | 0.82 | 753 | 0.50 |
| 20 | 80 | 0.82 | 753 | 0.49 | 0.80 | 750 | 0.50 |
| 40 | 60 | 0.80 | 751 | 0.50 | 0.80 | 751 | 0.51 |
| 50 | 50 | 0.79 | 750 | 0.52 | 0.81 | 750 | 0.49 |
| 60 | 40 | 0.74 | 733 | 0.58 | 0.81 | 747 | 0.51 |
| 80 | 20 | 0.67 | 722 | 0.70 | 0.79 | 746 | 0.52 |
| 100 | 0 | 0.67 | 724 | 0.71 | 0.66 | 723 | 0.76 |

EXAMPLE 17

The reaction product of gamma-chloropropyltrimethoxysilane with Gafac ® RE-610 (Example 1) was used to prepare magnetic tape samples, according to the methods of the above examples, at different dispersant levels and employing a high surface area magnetic pigment, Pferrico ® 5090 (Pfizer Pigments, Inc., New York, N.Y.). This pigment is described as a cobalt-modified iron oxide for high density recording media. The surface area of these particles is 41.9 square meters per gram, average dimensions are 0.04 micron (width) by 0.2 micron (length), average respect ratio is 5.5, pH is 8.8 and coercivity is 935 Oe. Procedures described above were followed and magnetic properties are reported in Table 3.

TABLE 3
MAGNETIC PROPERTIES OF MEDIA EMPLOYING DIFFERENT MAGNETIC PIGMENTS

| Dispersant | Pigment | Amount | SR | Hc | SFD |
|---|---|---|---|---|---|
| Example No. 1 | Pferrico ® 2566 | 4 pph | 0.82 | 753 | 0.49 |
| (gamma-chloro- | Pferrico ® 5090 | 4 pph | 0.65 | 925 | 0.80 |
| propyltri- | Pferrico ® 5090 | 6 pph | 0.70 | 940 | 0.59 |
| methoxysilane) | Pferrico ® 5090 | 8 pph | 0.78 | 984 | 0.58 |
| (Comparative) | Pferrico ® 2566 | 4 pph | 0.82 | 769 | 0.52 |
| Example No. 14 | Pferrico ® 5090 | 4 pph | 0.66 | 920 | 0.77 |
| (Gafac ® RE-610 | Pferrico ® 5090 | 6 pph | 0.79 | 965 | 0.61 |
| alone) | Pferrico ® 5090 | 8 pph | 0.80 | 972 | 0.59 |

EXAMPLE 18

The method used to prepare Example 1 was repeated, except this time the reactants were not heated to 60° C. This "cold-blend" was stored at room temperature for 5 days and then used to prepare magnetic tape samples (with Pferrico ® 2566 at 4 pph dispersant). These showed somewhat inferior magnetic properties relative to the dispersant of Example 1, as reported in Table 4.

TABLE 4
COMPARISON OF HEATED AND UNHEATED SILANE/GAFAC ® RE-610

| Dispersant | SR | Hc | SFD |
| --- | --- | --- | --- |
| Example No. 1 (Heated) | 0.81 | 754 | 0.48 |
| Example No. 18 (Cold Blend) | 0.80 | 754 | 0.51 |

EXAMPLES 19 to 21

The methods of Examples 1 to 15 were followed to prepare reaction products of gamma-chloropropyltrimethoxysilane with three different commercial phosphate esters. Equal parts of the silane and ester, based on solids, were employed.

Gafac ® RS-410 (GAF Corp., Wayne, N.J.) is described as being similar to Gafac ® RE-610 but having an aliphatic A group in the formulas cited in Examples 1 to 15, wherein X is $AO(CH_2CH_2O)_n$—. It is further described as a slightly hazy, viscous liquid, having a moisture content of less than 0.5%, a specific gravity of 1.03–1.04, an acid number of 95–115 and a pH of <2.5 (10% solution at 25° C.).

Gafac ® RE-877 (GAF Corp., Wayne, N.J.) is described as being similar to Gafac ® RE-610, also having an aromatic A group. It is further described as a clear, viscous liquid, having a moisture content of less than 25%, a specific gravity of 1.155, an acid number of 60–74 and a pH of <2.5 (10% solution at 25° C.).

Gafac ® RE-960 (GAF Corp., Wayne, N.J.) is described as being similar to Gafac ® RE-610, also having an aromatic A group. It is further described as a soft, waxy paste, having a moisture content of less than 10%, a specific gravity of 1.17–1.18, an acid number of 98–110 and a pH of <2.5 (10% solution at 25° C.).

The respective reaction products were used to prepare magnetic tapes, as described above, employing 4 pph of the dispersant and Pferrico ® 2566 pigment. Magnetic evaluation was carried out as before, and results are reported in Table 5.

TABLE 5
REACTION PRODUCTS OF GAMMA-CHLOROPROPYL-TRIMETHOXYSILANE WITH DIFFERENT PHOSPHATE ESTERS

| Example | Phosphate Ester | SR | Hc | SFD |
| --- | --- | --- | --- | --- |
| 19 | Gafac ® RS-410 | 0.81 | 754 | — |
| 20 | Gafac ® RE-877 | 0.80 | 754 | — |
| 21 | Gafac ® RE-960 | 0.82 | 764 | — |

I claim:

1. A composition comprising the reaction product of: (a) from about 40 to about 80 parts by weight of a phosphate ester represented by the formula

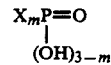

wherein X is independently selected from the group consisting of RO—, $RO(R'O)_n$— and

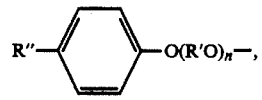

in which R represents an alkyl radical having from 1 to 25 carbon atoms, R' is an alkylene group having 2 to 4 carbon atoms, R" is an alkyl radical having 5 to 15 carbon atoms, n is an integer between 1 and 100 and the average value of m is between 1 and 2; and (b) from about 20 to about 60 parts by weight of a silicon compound selected from the group consisting of diphenylsilanediol and a silane represented by the formula

wherein R'" is an alkyl group having from 1 to 3 carbon atoms and Z is selected from the group consisting of an alkyl group having 1 to 6 carbon atoms, a haloalkyl group having 2 to 6 carbon atoms, an alkenyl group having 2 to 6 carbon atoms, acryloxypropyl, methacryloxypropyl and phenyl.

2. The composition of claim 1, wherein said phosphate ester is a blend of a mono-ester and a di-ester, X is selected from the group consisting of $RO(CH_2CH_2O)_n$— and

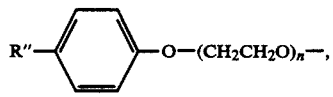

R and R" each has from 8 to 12 carbon atoms, n is between 5 and 40 and m is about 1.5.

3. The composition of claim 1, wherein R'" is methyl.

4. The composition of claim 2, wherein R'" is methyl.

5. The composition of claim 4, wherein Z is selected from the group consisting of gamma-chloropropyl, n-propyl, vinyl, methacryloxypropyl and phenyl.

6. The composition of claim 5 wherein said phosphate ester blend is further characterized as having an acid number between about 60 and 120.

7. The composition of claim 6, wherein said silicon compound is gamma-chloropropyltrimethoxysilane and the weight ratio of said silicon compound to said phosphate ester is about 50:50.

8. The composition of claim 3, wherein said Z group is selected from the group consisting of gamma-chloropropyl, n-propyl, vinyl, methacryloxypropyl and phenyl.

9. A magnetic coating composition comprising magnetic pigment particles, a binder for said particles, and a dispersant for said particles, wherein said dispersant is the composition of claim 1.

10. A magnetic coating composition comprising magnetic pigment particles, a binder for said particles, and a dispersant for said particles, wherein said dispersant is the composition of claim 5.

11. The magnetic coating composition of claim 10, wherein said magnetic pigment particles comprise iron oxide, cobalt-modified iron oxide or a metal alloy of iron, cobalt or nickel.

12. The magnetic coating composition of claim 11, wherein said binder is polyurethane.

13. A magnetic coating composition comprising magnetic pigment particles, a binder for said particles, and a dispersant for said particles, wherein said dispersant is the composition of claim 8.

14. The magnetic coating composition of claim 13, wherein said magnetic pigment particles comprise iron oxide, cobalt-modified iron oxide or a metal alloy of iron, cobalt or nickel.

15. The magnetic coating composition of claim 14, wherein said binder is polyurethane.

16. A process for producing a magnetic recording medium comprising:
(i) mixing magnetic pigment particles, a binder for said particles, a dispersant and an inert organic solvent capable of dissolving said binder, to obtain a uniform dispersion thereof;
(ii) coating said dispersion onto a non-magnetic substrate;
(iii) orienting said magnetic pigment particles in a magnetic field; and
(iv) removing said solvent from said dispersion, said dispersant comprising the reaction product of (a) from about 40 to about 80 parts by weight of a phosphate ester represented by the formula

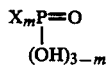

wherein X is independently selected from the group consisting of RO—, RO(R'O)$_n$— and

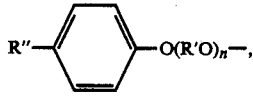

in which R represents an alkyl radical having from 1 to 25 carbon atoms, R' is an alkylene group having 2 to 4 carbon atoms, R" is an alkyl radical having 5 to 15 carbon atoms, n is an integer between 1 and 100 and the average value of m is between 1 and 2; and (b) from about 20 to about 60 parts by weight of a silicon compound selected from the group consisting of diphenylsilanediol and a silane represented by the formula

wherein R'" is an alkyl group having from 1 to 3 carbon atoms and Z is selected from the group consisting of an alkyl group having 1 to 6 carbon atoms, a haloalkyl group having 2 to 6 carbon atoms, an alkenyl group having 2 to 6 carbon atoms, acryloxypropyl, methacryloxypropyl and phenyl.

17. The process according to claim 16, wherein X is selected from the group consisting of RO(CH$_2$CH$_2$O)$_n$— and

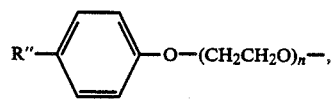

R and R" each has from 8 to 12 carbon atoms, n is between 5 and 40, m is about 1.5, R'" is methyl and wherein Z is selected from the group consisting of gamma-chloropropyl, n-propyl, vinyl, methacryloxypropyl and phenyl.

18. The process according to claim 16, wherein R'" is methyl and Z is selected from the group consisting of gamma-chloropropyl, n-propyl, vinyl, methacryloxypropyl and phenyl.

19. The process according to claim 17, wherein said magnetic pigment particles comprise iron oxide, cobalt-modified iron oxide or a metal alloy of iron, cobalt or nickel.

20. The process according to claim 19, wherein said binder is polyurethane.

21. The process according to claim 18, wherein said magnetic pigment particles comprise iron oxide, cobalt-modified iron oxide or a metal alloy of iron, cobalt or nickel.

22. The process according to claim 21, wherein said binder is polyurethane.

* * * * *